(12) United States Patent
Kearney et al.

(10) Patent No.: US 8,474,712 B2
(45) Date of Patent: Jul. 2, 2013

(54) METHOD OF AND SYSTEM FOR DISPLAYING PRODUCT RELATED INFORMATION AT POS-BASED RETAIL CHECKOUT SYSTEMS

(75) Inventors: Sean Philip Kearney, Marlton, NJ (US); Patrick Anthony Giordano, Glassboro, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/248,364

(22) Filed: Sep. 29, 2011

(65) Prior Publication Data

US 2013/0082104 A1    Apr. 4, 2013

(51) Int. Cl.
*G06K 7/10* (2006.01)

(52) U.S. Cl.
USPC ..................... 235/383; 235/472.01

(58) Field of Classification Search
USPC ...... 235/383, 462.01–462.42, 472.01–472.03
See application file for complete search history.

(56) References Cited

U.S. PATENT DOCUMENTS

| | | | |
|---|---|---|---|
| 4,652,732 A | 3/1987 | Nickl | |
| 6,814,292 B2 | 11/2004 | Good | |
| 6,974,083 B1 | 12/2005 | Kahn et al. | |
| 7,128,266 B2 | 10/2006 | Zhu et al. | |
| 7,137,555 B2 | 11/2006 | Bremer et al. | |
| 7,191,947 B2 | 3/2007 | Kahn et al. | |
| 7,422,156 B2 | 9/2008 | Good | |
| 7,527,203 B2 | 5/2009 | Bremer et al. | |
| 7,540,424 B2 | 6/2009 | Knowles et al. | |
| 8,132,730 B2 * | 3/2012 | Iizaka et al. | 235/454 |
| 2003/0115103 A1 * | 6/2003 | Mason | 705/16 |
| 2007/0290043 A1 * | 12/2007 | Russell et al. | 235/462.14 |
| 2008/0164309 A1 * | 7/2008 | Latimer et al. | 235/383 |
| 2008/0283611 A1 | 11/2008 | Knowles et al. | |
| 2008/0314985 A1 | 12/2008 | Kotlarsky et al. | |
| 2011/0145078 A1 * | 6/2011 | Iizaka et al. | 705/17 |
| 2012/0248188 A1 * | 10/2012 | Kearney | 235/440 |

* cited by examiner

*Primary Examiner* — Thien M Le
(74) *Attorney, Agent, or Firm* — Summa, Additon & Ashe, P.A.

(57) ABSTRACT

A bi-optical code symbol reading system including a system housing having a vertical housing section with a vertical window and a horizontal housing section with a horizontal window adjacent the vertical scanning window; and a digital video display subsystem, disposed within the vertical section of the system housing, and supporting the display of digital images in substantially the same plane as the vertical window during system operation. The digital images displayed by digital video display subsystem can be video images captured by an integrated digital imaging code symbol reading subsystem, to assist the operator in aligning code symbols during scanning operations. The digital images can also be product and price information captured during product scanning operations.

20 Claims, 16 Drawing Sheets

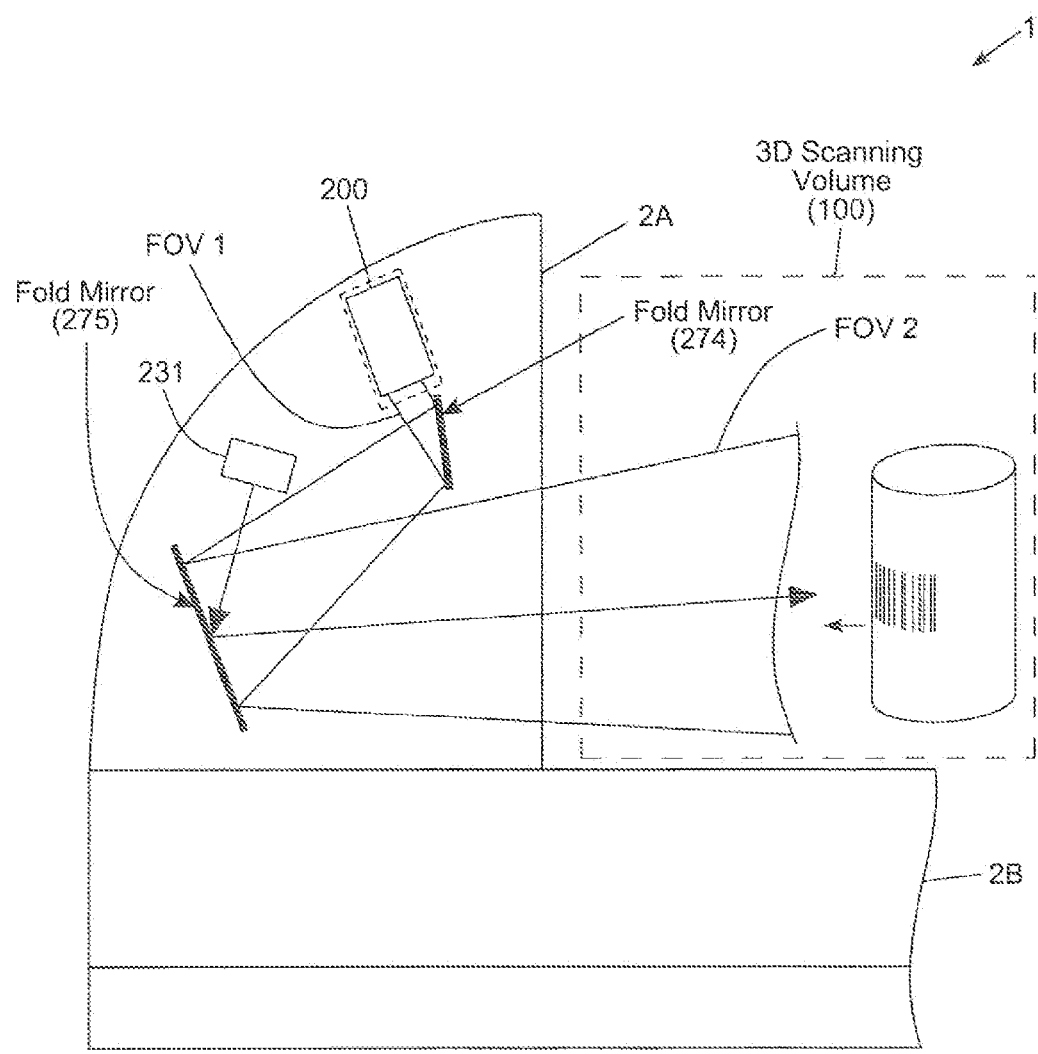
FIG. 1A1

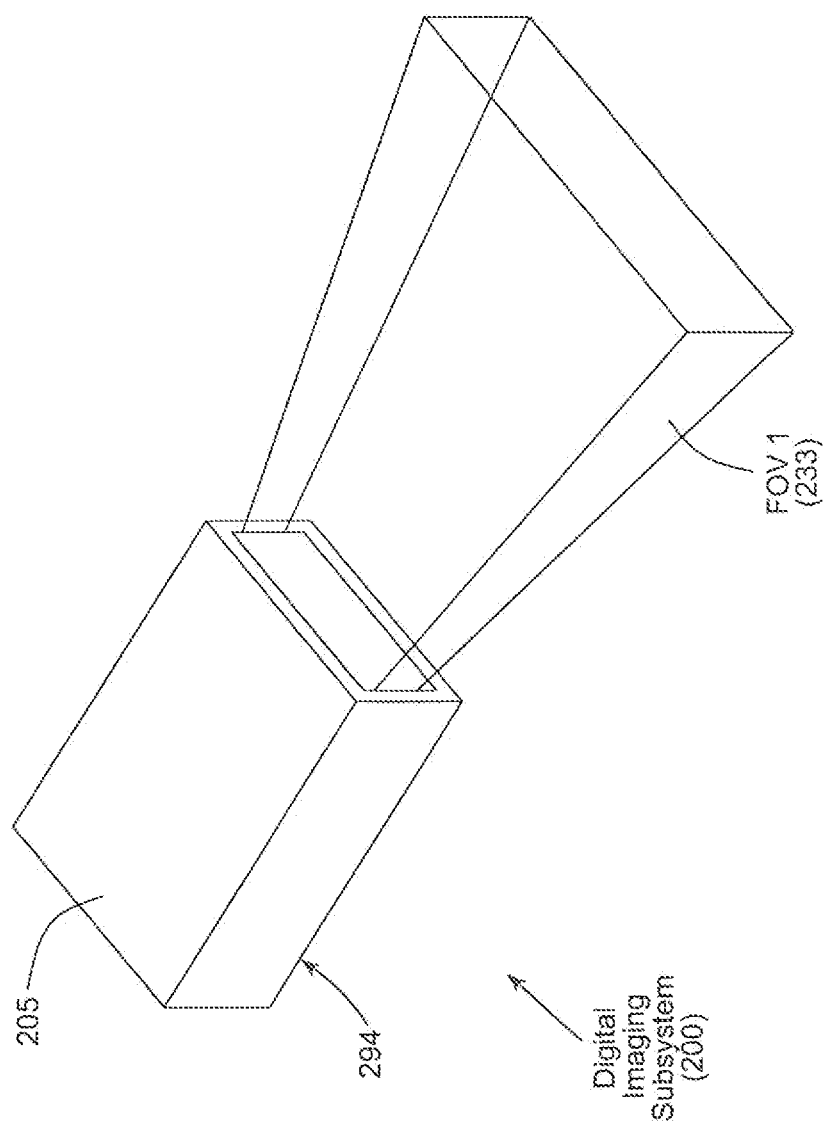
FIG. 1A2

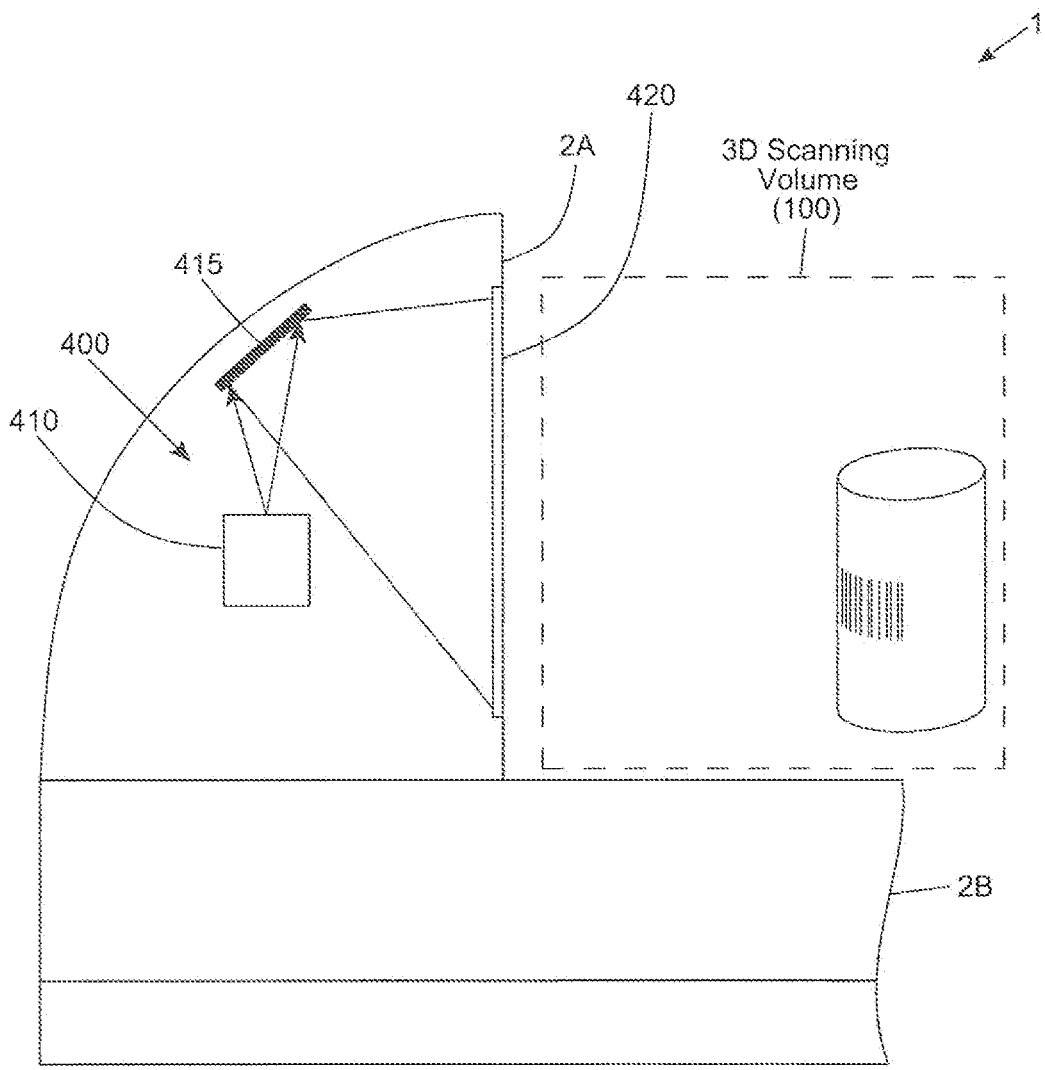
FIG. 1B1

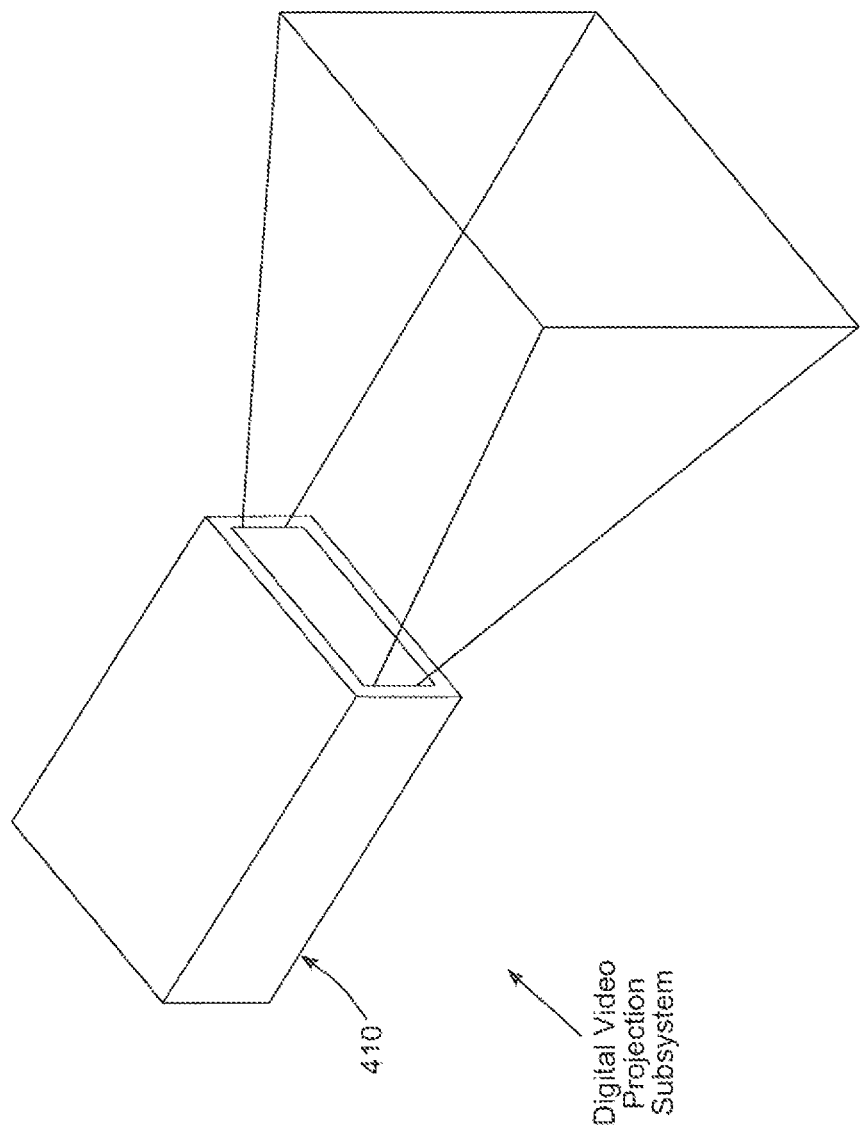

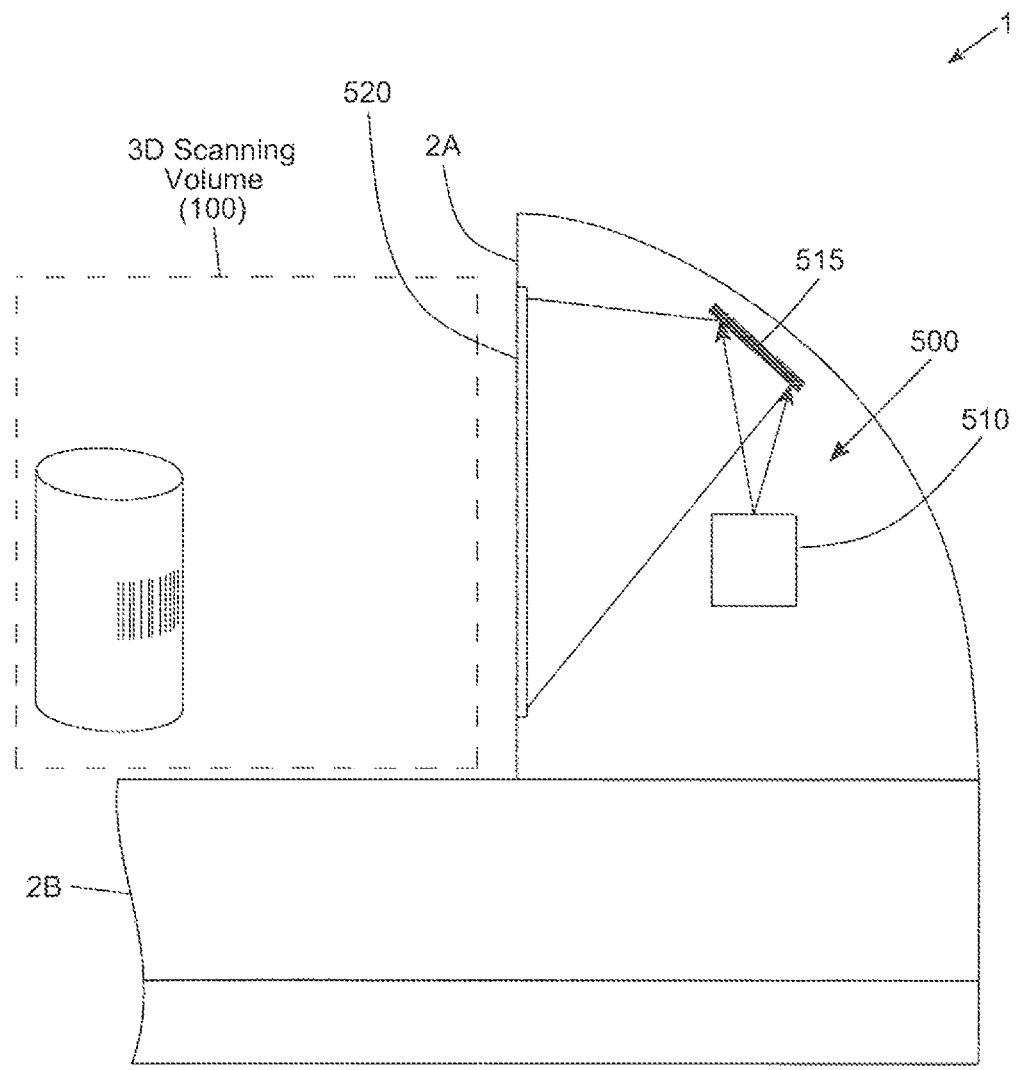
FIG. 1C1

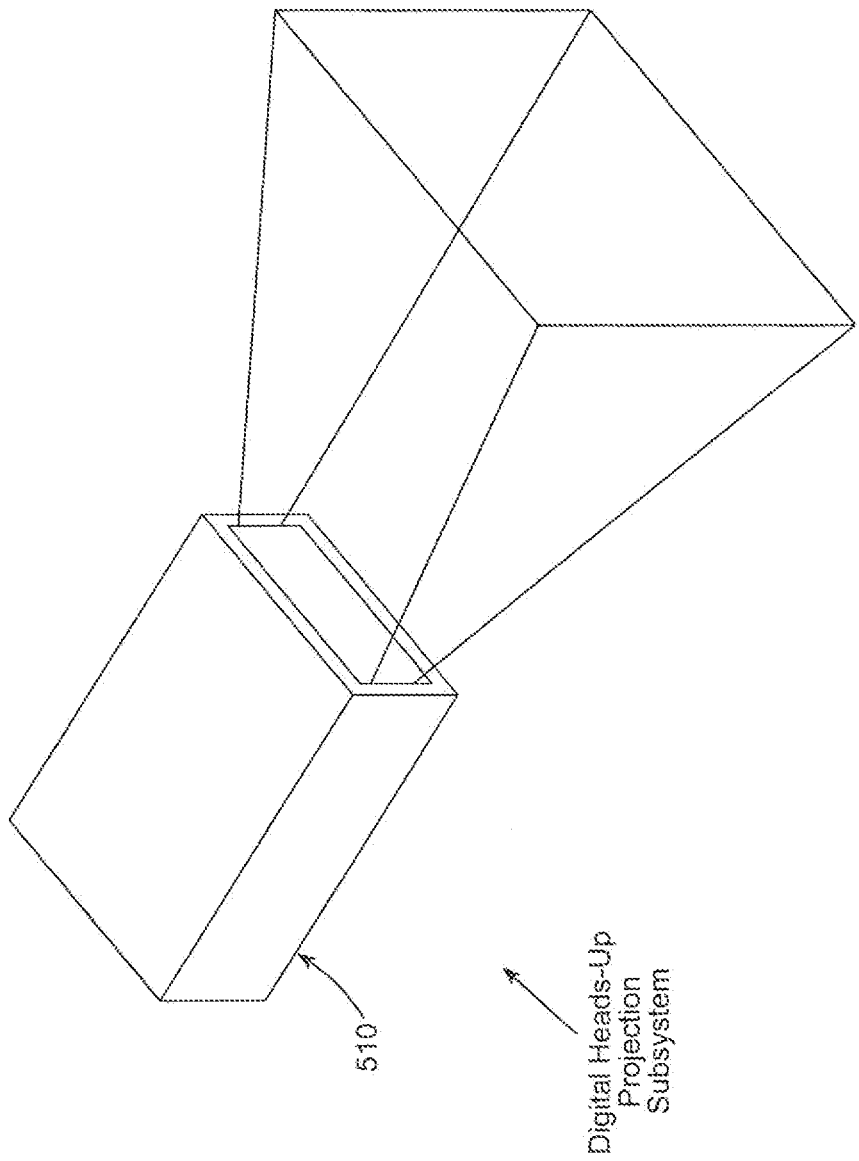
FIG. 1C2

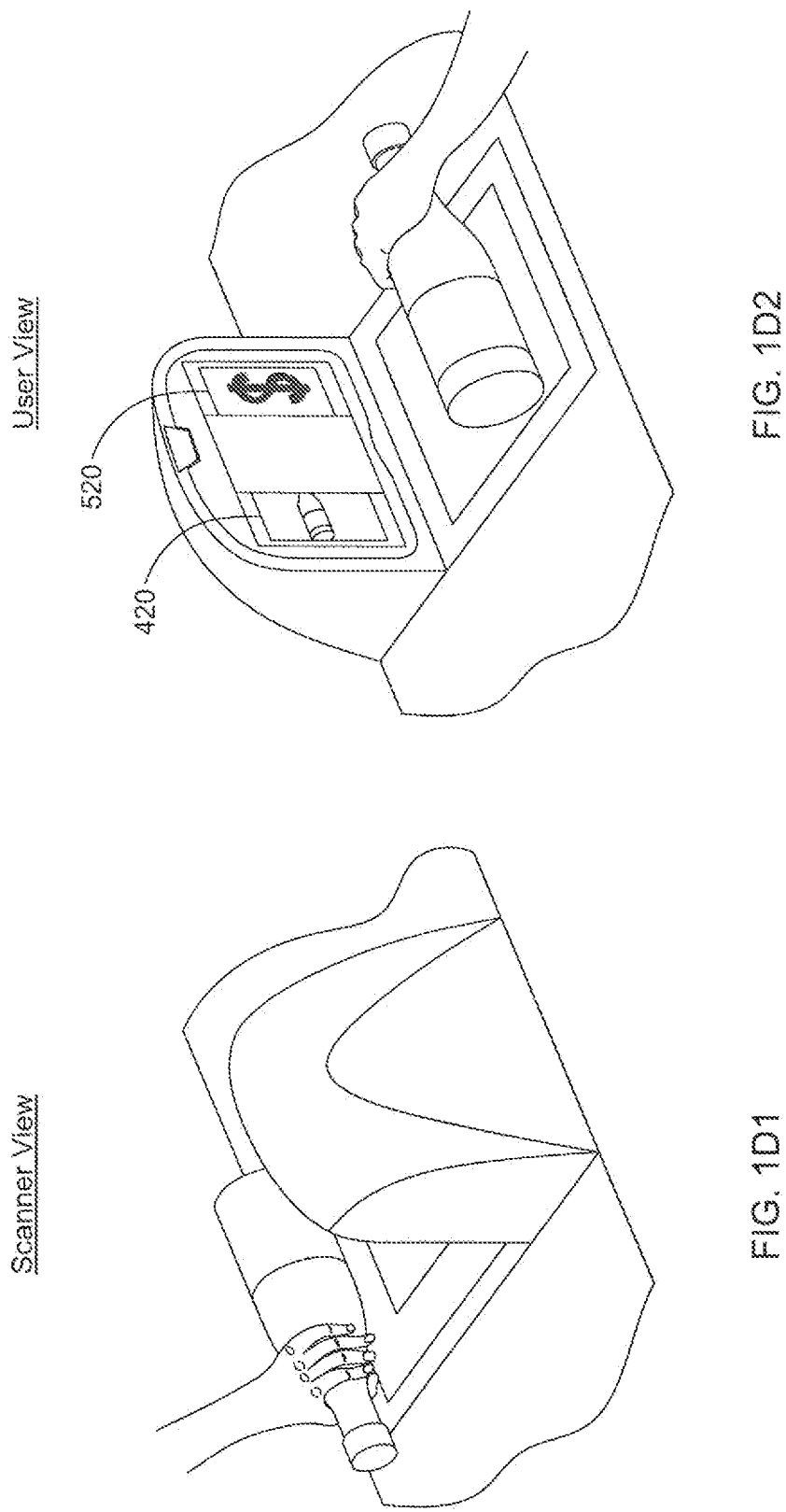

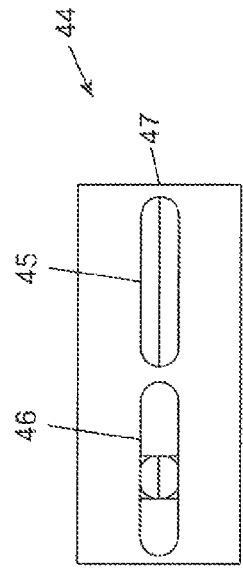
FIG. 4A3
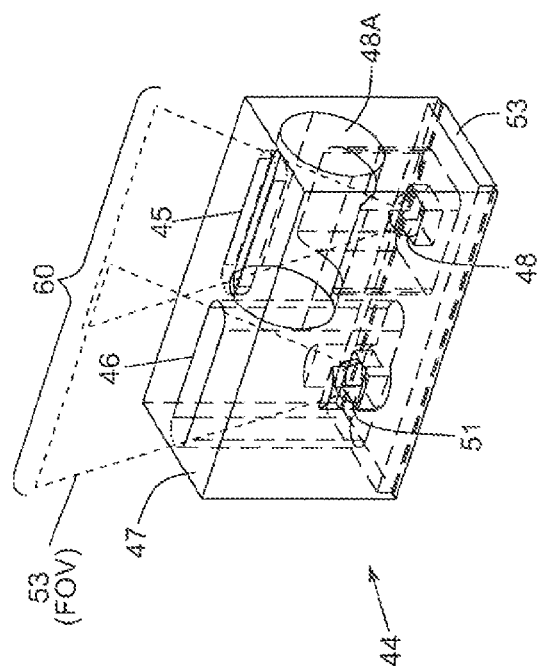
FIG. 4A4
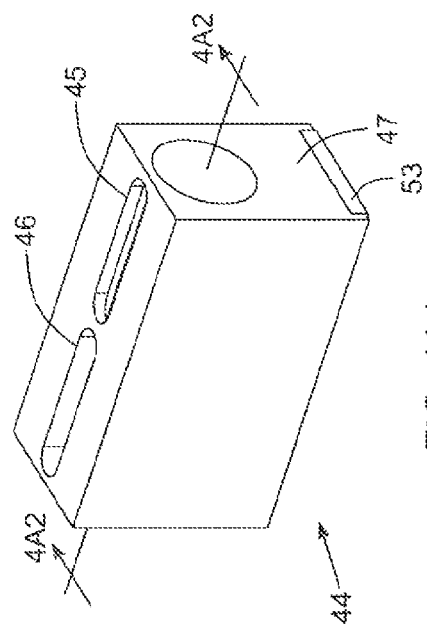
FIG. 4A1
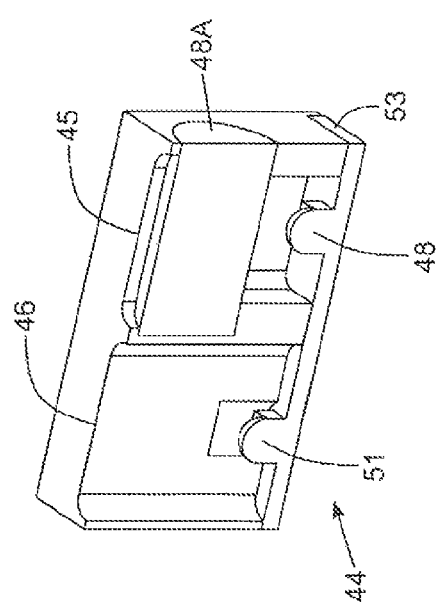
FIG. 4A2

METHOD OF AND SYSTEM FOR DISPLAYING PRODUCT RELATED INFORMATION AT POS-BASED RETAIL CHECKOUT SYSTEMS

BACKGROUND OF DISCLOSURE

1. Field of Disclosure

The present disclosure relates generally to improvements in checking out consumer products to be purchased at retail point-of-sale (POS) environments, using POS-based checkout stations located therein.

2. Brief Description of the State of Knowledge in the Art

In the POS environment, items to be checked out (i.e. purchased) are scanned at a retail POS station using a bar code symbol reading system interfaced with a host system that is connected to a local area network, on which the retailer's product price database is installed. The use of bar code symbols for product and article identification is well known in the art. Presently, various types of bar code symbol scanners have been developed for reading bar code symbols at retail points of sale (POS).

In demanding retail environments, such as supermarkets and high-volume department stores, where high check-out throughput is critical to achieving store profitability and customer satisfaction, it is common to use laser scanning bar code reading systems having both bottom and side-scanning windows to enable highly aggressive scanner performance. In such systems, the cashier need only drag a bar coded product past these scanning windows for the bar code thereon to be automatically read with minimal assistance of the cashier or checkout personal. Such dual scanning window systems are typically referred to as "bi-optical" laser scanning systems as such systems employ two sets of optics disposed behind the bottom and side-scanning windows thereof. Examples of polygon-based bi-optical laser scanning systems are disclosed in U.S. Pat. Nos. 4,229,588; 4,652,732 and 6,814,292; each incorporated herein by reference in its entirety. Commercial examples of bi-optical laser scanners include: the PSC 8500-6-sided laser based scanning by PSC Inc.; PSC 8100/8200, 5-sided laser based scanning by PSC Inc.; the NCR 7876-6-sided laser based scanning by NCR; the NCR7872, 5-sided laser based scanning by NCR; and the MS232x Stratos®H, and MS2122 Stratos® E Stratos 6 sided laser based scanning systems by Metrologic Instruments, Inc., and the MS2200 Stratos®S 5-sided laser based scanning system by Metrologic Instruments, Inc.

With the increasing appearance of 2D bar code symbologies in retail store environments (e.g. reading driver's licenses for credit approval, age proofing etc.), there is a growing need to support digital-imaging based bar code reading—at point of sale (POS) stations.

U.S. Pat. No. 7,540,424 B2 and U.S. Publication No. 2008/0283611 A1, assigned to Metrologic Instruments, Inc, describes high-performance digital imaging-based POS bar code symbol readers employing planar illumination and digital linear imaging techniques, as well as area illumination and imaging techniques.

Also, U.S. Pat. Nos. 7,137,555; 7,191,947; 7,246,747; 7,527,203 and 6,974,083 disclose hybrid laser scanning and digital imaging systems, in which a digital imager is integrated within a POS-based laser scanning bar code symbol reading system. In such system designs, the digital imager helps the operator read poor quality codes, and also enables the hybrid system to read 2-D symbologies. The use of digital imaging at the POS is able to capture virtually every dimension and perspective of a bar code symbol, and is able to make more educated decisions on how to process code symbologies.

Today, conventional bi-optical laser scanning systems, digital imaging systems, and hybrid scanning/imaging systems deployed at POS stations have very limited capabilities for displaying price and other product related information that might be captured or otherwise generated at the POS station, and thus the host system and its peripheral devices have been relied upon to display such information at the POS station. This has resulted in increasing the physical footprint of such conventional POS checkout systems, which is undesired because of the great commercial value of countertop space at the POS station.

Thus, despite the many improvements in both laser scanning and digital imaging based bar code symbol readers over the years, there is still a great need in the art for improved POS-based checkout systems supporting improved ways of displaying visual and graphical information during retail transactions, while avoiding the shortcomings and drawbacks of prior art systems and methodologies.

OBJECTS AND SUMMARY

Accordingly, a primary object of the present disclosure is to provide an improved way of and means for displaying information at bi-optical checkout systems installed in POS environments, which is free of the shortcomings and drawbacks of prior art systems and methodologies.

Another object is to provide a bi-optical hybrid-type bar code symbol reading system with a digital video projection module mounted within the vertical section of its system housing, for projecting onto the vertical scanning window, digital video images of a product being presented to the field of view (FOV) of 3D scanning/imaging volume during bar code symbol reading operations at a POS station, to provide visual feedback and improve bar code symbol and FOV alignment during bar code symbol reading operations.

Another object is to provide a bi-optical hybrid-type bar code symbol reading system with digital heads-up display (HUD) image projection module mounted within the vertical section of its system housing, for projecting onto the vertical scanning window, digital image(s) of a product-specific HUD, as soon as the product has been successfully scanned using any of the data captures modes supported by the hybrid system.

Another object is to provide a bi-optical bar code symbol reading system with a digital video projection module mounted within the vertical section of its system housing, for projecting onto the vertical scanning window, digital video images of a product being presented to the field of view (FOV) of 3D scanning/imaging volume during bar code symbol reading operations at a POS station, to provide visual feedback and improve bar code symbol and FOV alignment during bar code symbol reading operations.

Another object is to provide a bi-optical bar code symbol reading system with digital heads-up display (HUD) image projection module mounted within the vertical section of its system housing, for projecting onto the vertical scanning window, digital image(s) of a product-specific HUD, as soon as the product has been successfully scanned and identified by the system.

Another object is to provide a POS-based product checkout scanner that helps provide improvements in worker productivity and checkout speed and throughput.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which:

FIG. 1A1 is a cross-sectional side view of the hybrid-type bi-optical bar code symbol reading system of FIG. 1, showing the FOV of digital imaging module being folded by folding mirrors mounted within the vertical section of the system housing, and projected through the vertical scanning window into the 3D scanning volume of the system in which a product is presented for bar code symbol reading;

FIG. 1A2 is a perspective view of the digital imaging module removed from the vertical housing section shown in FIG. 1A1, projecting its field of view (FOV) from its imaging window;

FIG. 1B1 is a cross-sectional side view of the hybrid-type bi-optical bar code symbol reading system of FIG. 1A, showing the digital video projection module and first projection field folding mirror mounted within the vertical section of the system housing, for projecting digital video images of a product presented to the field of view (FOV) of 3D scanning/imaging volume during bar code symbol reading operations at the POS;

FIG. 1B2 is a perspective view of the digital video projection module shown removed from the vertical housing section shown in FIG. 1B1, and projecting its field of view (FOV) from its projection window;

FIG. 1C1 is a cross-sectional side view of the hybrid-type bi-optical bar code symbol reading system of FIG. 1A, showing the digital heads-up display (HUD) image projection module and second projection field folding mirror mounted within the vertical section of the system housing, for projecting a digital image(s) of a product-specific HUD on the inside surface of the vertical scanning window, as soon as the product has been successfully scanned using any of the data captures modes supported by the hybrid system;

FIG. 1C2 is a perspective view of the digital heads-up image projection module shown removed from the vertical housing section shown in FIG. 1C1, and projecting its field of view (FOV) from its projection window;

FIG. 1D1 is a perspective view of the hybrid-type bi-optical bar code symbol reading system of FIG. 1, taken from the customer side of the system, showing a product being scanned during checkout operations;

FIG. 1D2 is a perspective view of the hybrid-type bi-optical bar code symbol reading system of FIG. 1, taken from the cashier side of the system, showing projected on the vertical scanning window, (i) real-time digital video of a product being scanned (captured by the FOV of the digital imaging subsystem installed in the vertical scanning window), and (ii) a digital heads-up display (HUD) displaying price and related information of the product successfully scanned (i.e. identified) during scanning operations;

FIG. 2 is a block schematic representation of the bi-optical code symbol reading system of FIGS. 1A through 1D2, wherein (i) a pair of laser scanning stations, disposed within the system, support automatic laser scanning of bar code symbols along a complex of scanning planes passing through the 3D scanning volume of the system, (ii) a digital imaging module, disposed within the system housing, and supporting the capture of digital video of projects presented within the field of view (FOV) of the digital imaging module, (iii) a digital video projection display subsystem, disposed within the vertical section of the system housing, and supporting the display of read-time video frames on the vertical scanning window during digital-imaging based bar code symbol reading operations, and (iv) a digital heads-up display (HUD) image projection subsystem, disposed within the vertical section of the system housing, and supporting the projection display of a HUD containing price and other information of the product successfully scanned and identified by the system during checkout operations at the POS station;

FIG. 4A1 is a perspective view of a single IR-based object detection module employed in the construction of the automatic object edge-motion detection subsystem in the system of FIGS. 1 through 4;

FIG. 4A2 is a plan view of a single IR-based object detection module shown in FIG. 4A1;

FIG. 4A3 is a cross-sectional view of a single IR-based object detection module shown in FIG. 4A1, taken along line 4A3-4A3 shown therein;

FIG. 4A4 is a perspective partial phantom view of a single IR-based object detection module shown in FIG. 4A1;

DETAILED DESCRIPTION OF THE ILLUSTRATIVE EMBODIMENT

Figure 1:
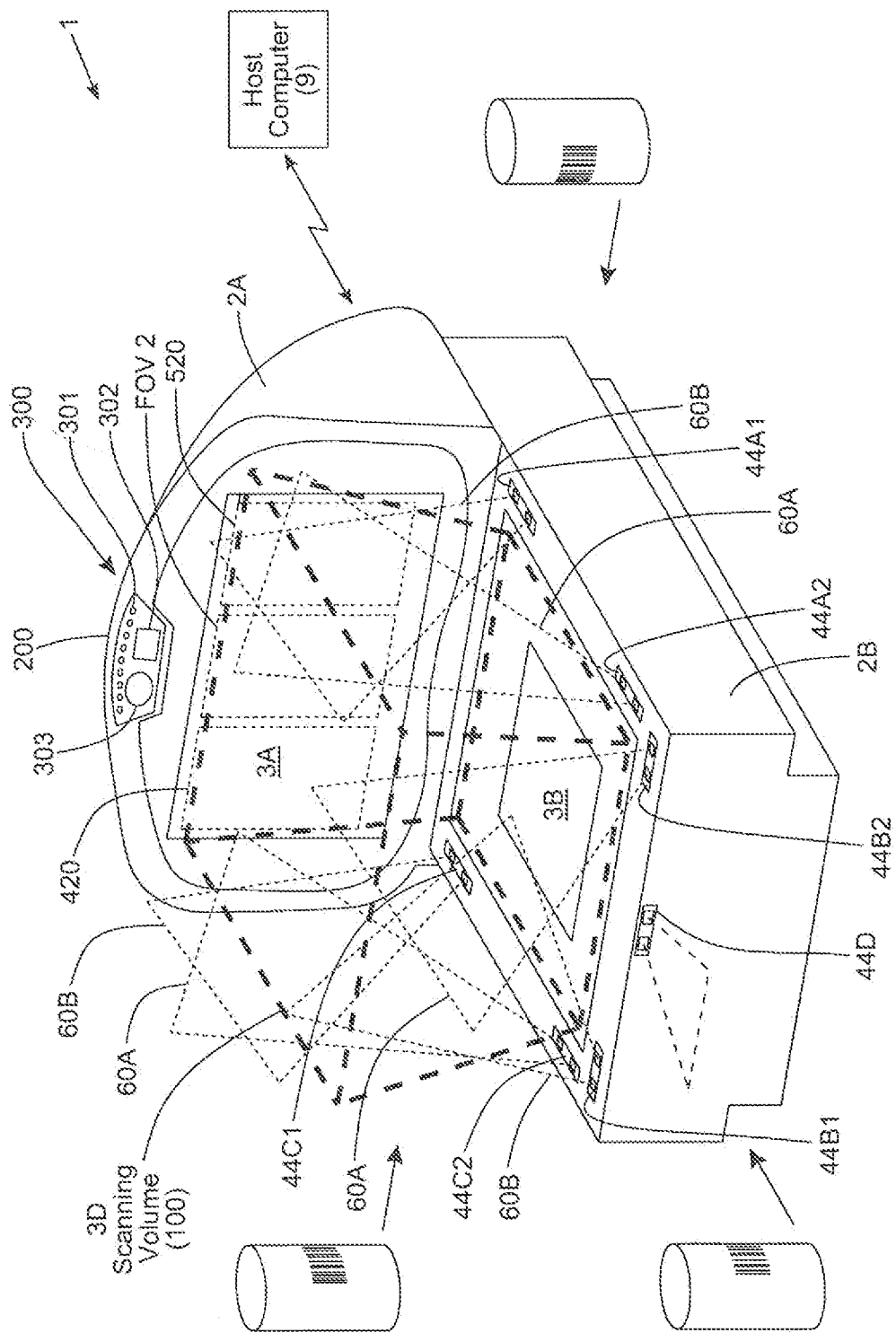
FIG. 1 is a perspective view of an illustrative embodiment of the hybrid-type bi-optical bar code symbol reading system installed at a point of sale (POS) checkout station in a retail environment, and capable of displaying information projected on the vertical scanning window during system operation.

Referring to the figures in the accompanying Drawings, the various illustrative embodiments of the apparatus and methodologies will be described in great detail, wherein like elements will be indicated using like reference numerals.

Figure 4:
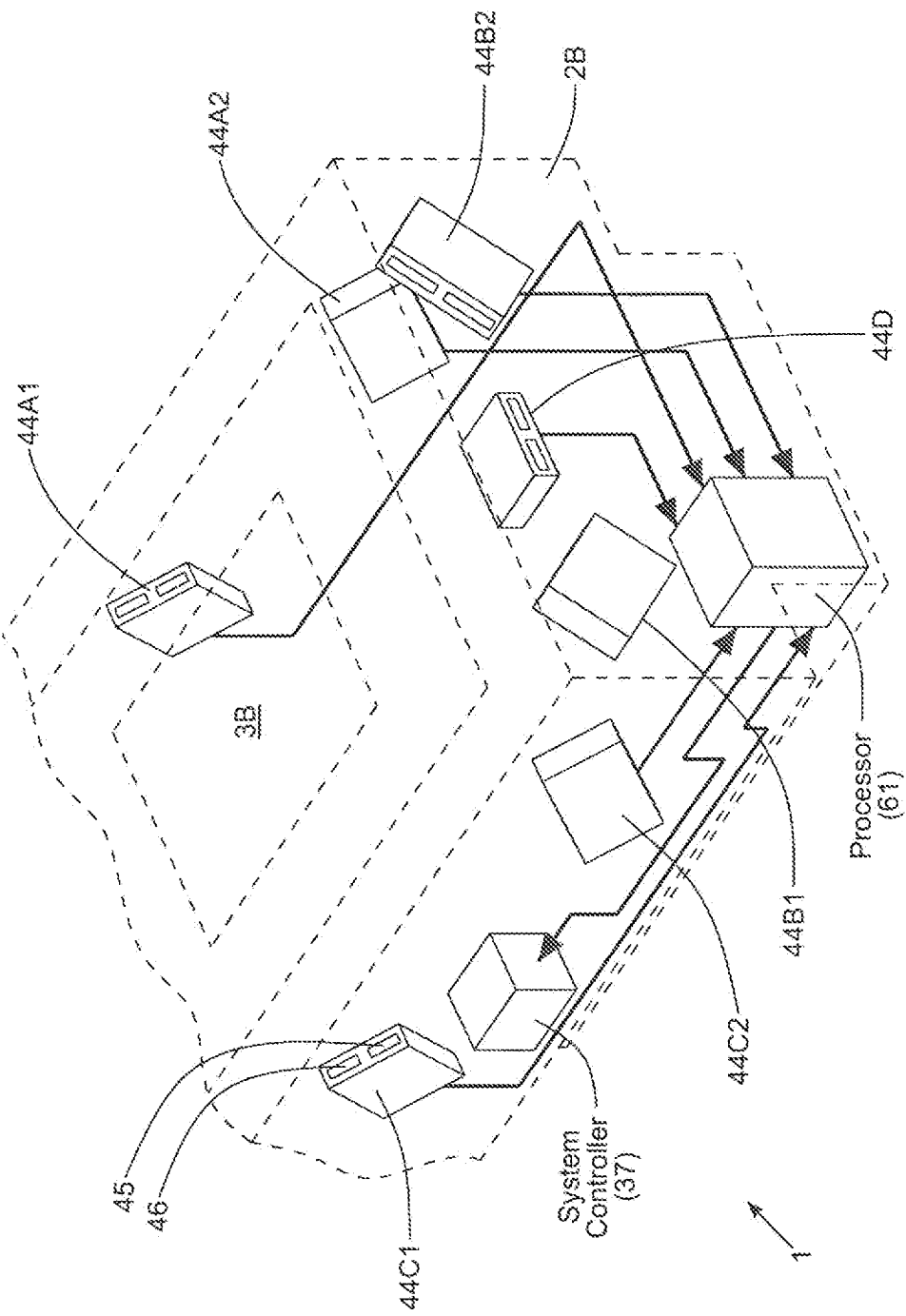
FIG. 4 is a partially cut-away perspective view of the hybrid scanning and imaging code symbol reading system of FIGS. 1A through 3, showing its automatic IR-based object edge-motion detection subsystem mounted about the horizontal scanning window so as to be able to automatically detect objects passing across the edge regions of the 3D scanning volume of the system.

FIGS. 1A through 4A4 show an illustrative embodiment of the hybrid laser-scanning/digital-imaging (i.e. scanning/imaging) based bar code symbol reading system 1 of the present disclosure supporting three different modes of operation, namely: (i) a sleep mode of operation; (ii) a laser scanning (only) mode of operation; and (iii) a hybrid scanning and imaging mode of operation.

As shown in FIGS. 1A, 1B and 1C, the bi-optical code symbol reading system of the illustrative embodiment includes a system housing 2 having a vertical housing section 2A having a vertical optically transparent (glass) scanning window 3A, and a horizontal housing section 2B having a horizontal optically transparent (glass) scanning window 3B having first, second and third edges. Typically, the system is installed at a retail point of sale (POS) checkout station, well known in the art. The retail POS station will have a countertop surface, and oftentimes a conveyor belt for moving products towards the bar code symbol reading system. Also provided is a host computer system 9 that is connected to the retail LAN and/or WAN on which one or more product price database systems (RDBMS) will be deployed.

Figure 2:
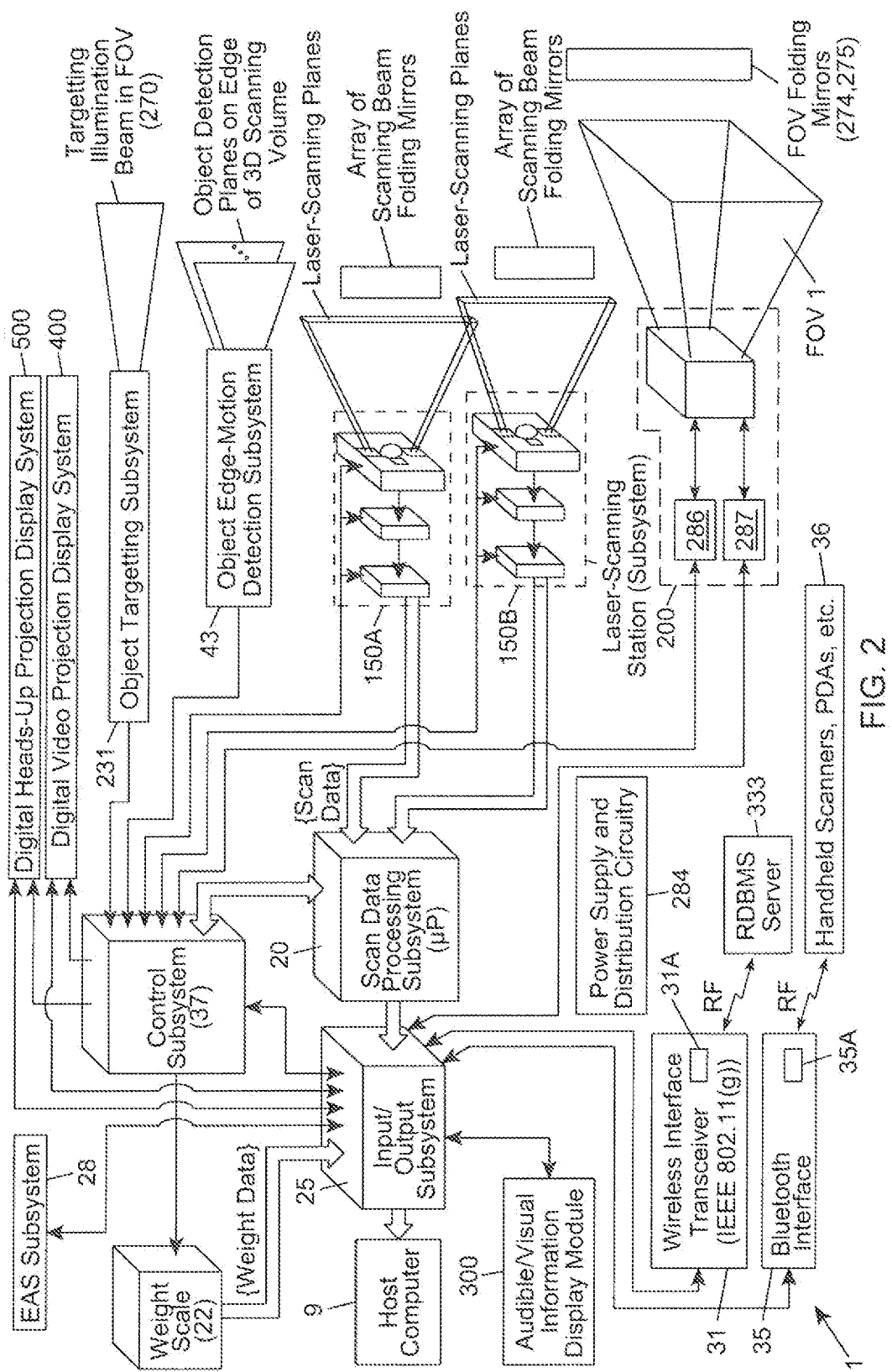

As shown in FIGS. 1 and 1D2, the vertical scanning window supports (i) digital heads-up display (HUD) image projection display region/surface 420 on the left side of the scanning window, and (ii) digital video image projection display region/surface 520 on the right side of the scanning window, while the central portion of the scanning window is used to project laser scanning planes and a digital field of view ((FOV) into a 3D scanning/imaging volume 100 defined and supported between the vertical and horizontal scanning windows of the system.

As shown in FIGS. 1, 1A1, 1B1 and 2, the horizontal and vertical sections 2A and 2B of the system housing are arranged in an orthogonal relationship so that the horizontal and vertical scanning windows 3A and 3B are substantially perpendicular. A laser scanning subsystem, supporting first and second laser scanning stations 150A and 150B, is mounted within the system housing, and generates and projects a complex groups of laser scanning planes through laser scanning windows 3A and 3B. These laser scanning planes intersect and produce an omni-directional laser scanning pattern within the 3D scanning volume 100, as shown in FIGS. 1 and 1C. In the illustrative embodiment, each laser scanning station 150A, 150B is constructed from a rotating polygon, a laser diode source, light collection optics, a photodiode, and other optical components arranged as disclosed in U.S. Pat. No. 7,422,156, incorporated herein by reference, as if set forth fully herein.

As shown in FIG. 1A, an IR-based proximity detector 44D is mounted in the front portion of the housing for automatically detecting the presence of a human operator in front of the 3D scanning volume 100 during system operation. The function of the IR-based proximity detector 44D is to wake up the system (i.e. WAKE UP MODE), and cause a SLEEP Timer (T1) to be set to count how long the system has to read a bar code symbol (e.g. 15 minutes) before the system is automatically induced into its SLEEP MODE, where the polygon scanning element and laser diodes are deactivated to conserve electrical within the system. Preferably, the IR-based proximity (i.e. wake-up) detector 44D is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art.

Figure 3:
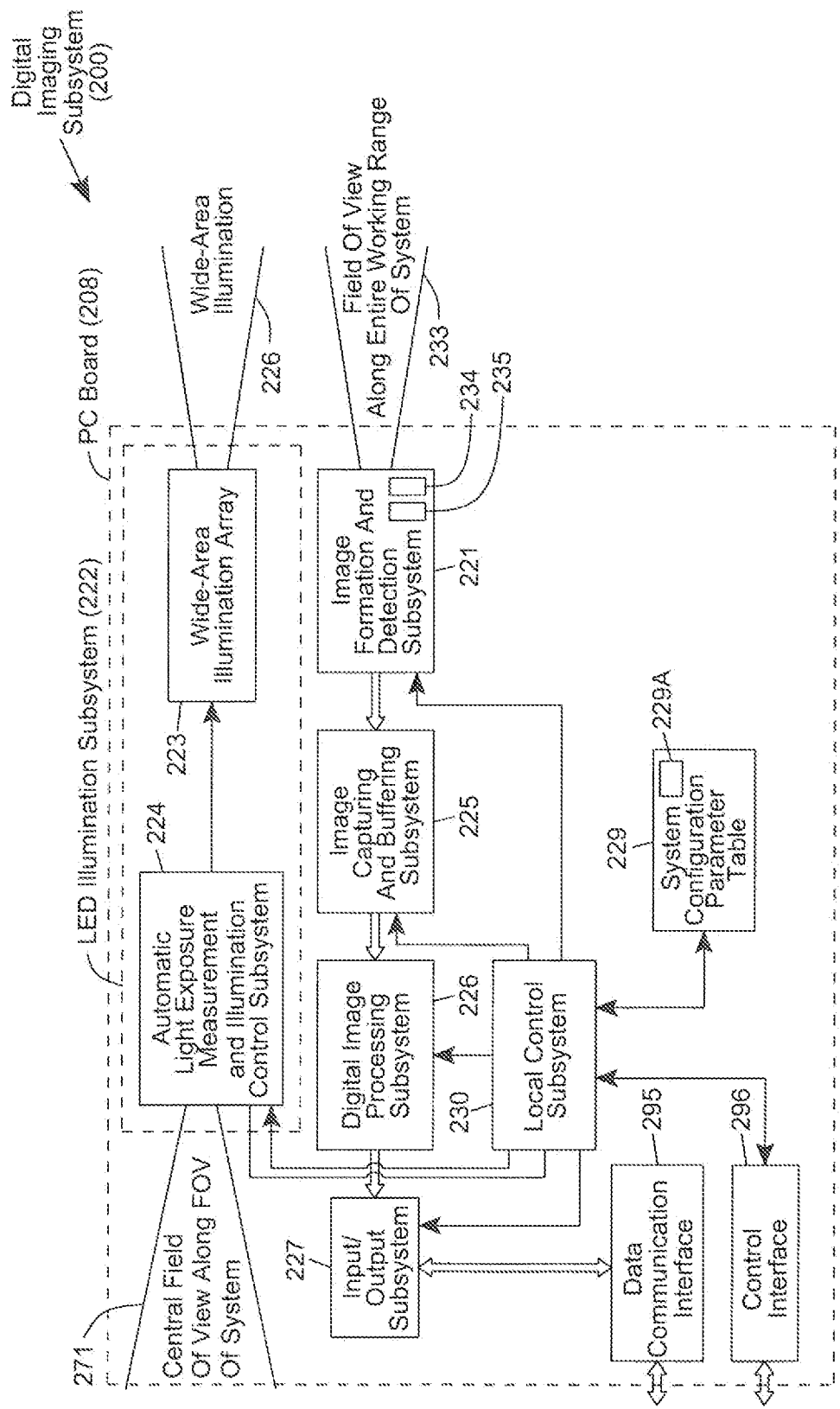
FIG. 3 is a block schematic representation of the digital imaging module (i.e. subsystem) supported within the bi-optical code symbol reading system of FIGS. 1A through 1C.

As shown in the system diagram of FIG. 2, bi-optical system 1 generally comprises: laser scanning stations 150A and 150B, described above, for generating and projecting groups of laser scanning planes through the vertical and horizontal scanning windows 3A and 3B, respectively, and generating scan data streams from scanning objects in the 3D scanning volume 100; a scan data processing subsystem (i.e. scan data processor) 20 for supporting automatic scan data processing based bar code symbol reading using scan data streams generated from stations 150A and 150B; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® EAS tag deactivation block 29 integrated in system, and an audible/visual information display subsystem (i.e. module) 300, and supporting universal, standard and/or proprietary data communication interfaces with host system 9 and other external devices; a BlueTooth® RF 2-way communication interface 35 including RF transceivers and antennas for connecting to Blue-tooth® enabled hand-held scanners, imagers, PDAs, portable computers 36 and the like, for control, management, application and diagnostic purposes; digital imaging subsystem module 200 specified in FIGS. 1A2 and 3; a control subsystem 37 for controlling (i.e. orchestrating and managing) the operation of the laser scanning stations (i.e. subsystems), the functions of the digital imaging subsystem 200, other subsystems supported in the system; IR-based wake-up detector 44D, operably connected to the control subsystem 37, for generating and supplying a first trigger signal to the system controller in response to automatic detection of an operator in proximity (e.g. 1-2 feet) of the system housing; an IR-based object edge-motion detection subsystem 43 for producing IR-based planar object detection fields at the edge of the 3D scanning volume 100 of the system, as shown in FIGS. 1A and 4, for detecting the motion of objects entering and exiting the 3D scanning volume 100; an object targeting subsystem 231 for generating and projecting a visible narrow-area targeting illumination field 270 within the FOV of the digital imaging subsystem 200, in response to control signals generated by the system controller 37; a digital video projection display subsystem 400 including a digital video projection module 450 and FOV folding mirror 415, for projecting digital images on projection display region 420 on the vertical scanning window 3A in the vertical housing section 2A; and a digital heads-up projection display subsystem 500 including a digital heads-up projection module 510 and FOV folding mirror 515, for projecting digital images on projection display region 520 on the vertical scanning window 3A in the vertical housing section 2A.

In FIG. 2, the bar code symbol reading module employed along each data processing channel of the scan data processing subsystem 20 can be realized using conventional bar code reading techniques, including bar code symbol stitching-based decoding techniques, well known in the art.

As shown in FIG. 1B, the digital imaging subsystem 200 is mounted as a module within the vertical section of the system housing, and includes an optical element 210 which modifies the optical characteristics of its field of view (FOV1). The FOV is then folded several times by way of FOV folding mirrors 274 through 275, to provide a modified field of view (FOV2) that extends through the vertical scanning window 3A, into the 3D scanning volume 100, as shown in FIG. 1B. While not a requirement, one or more of these FOV folding mirrors may be supplied by laser scanning pattern folding mirrors provided in the vertical housing section of the system housing. Preferably, the resulting field of view (FOV2) will extend deep into the 3D scanning volume (e.g. 12 inches or more), with a substantial depth of focus (e.g. 3-12 inches) before the vertical scanning window 3A. During the bi-optical mode of operation, the FOV spatially overlaps a substantial portion of the 3D scanning volume 100 of the system.

As shown in FIG. 3, the digital imaging subsystem 200 employed in the illustrative embodiment of the bi-optical system 1 is realized from a number of components, namely: an image formation and detection (i.e. camera) subsystem 221 having image formation (camera) optics 234 for producing a field of view (FOV) upon an object to be imaged and a CMOS or like area-type image detection array 235 for detecting imaged light reflected off the object during illumination operations in an image capture mode in which at least a plurality of rows of pixels on the image detection array are enabled; a LED-based illumination subsystem 222 employing an LED illumination array 232 for producing a field of narrow-band wide-area illumination 226 within the entire FOV 233 of the image formation and detection subsystem 221, which is reflected from the illuminated object and transmitted through a narrow-band transmission-type optical filter and detected by the image detection array 35, while all other components of ambient light are substantially rejected; an automatic light exposure measurement and illumination control subsystem 224 for controlling the operation of the LED-based illumination subsystem 222; an image capturing and buffering subsystem 225 for capturing and buffering 2-D images detected by the image formation and detection subsystem 221; a digital image processing subsystem (i.e. digital image processor) 226 for processing 2D digital images captured and buffered by the image capturing and buffering subsystem 225 and reading 1D and/or 2D bar code symbols represented therein; an input/output subsystem 527 for outputting processed image data (e.g. symbol character data) and the like (e.g. raw image data files) to an external host system 9; a system memory 229 for storing data implementing a configuration table 229A of system configuration parameters (SCPs); data/power/control interface 294 including a data communication interface 295 interfacing with interface module 287, and a control interface 296 interfacing with interface module 286; a Bluetooth communication interface, interfaced with I/O subsystem 227; and a system control subsystem (i.e. system controller) 230 integrated with the subsystems above, for controlling and/or coordinating the subsystems of the digital imaging subsystem 200 during system operation.

The primary function of the object targeting subsystem 231 is to automatically generate and project a visible linear-targeting illumination beam across the FOV of the system during the hybrid scanning and imaging mode of operation. In order to implement the object targeting subsystem 231, a pair of visible LEDs can be arranged on opposite sites of the FOV optics 234, or located elsewhere within the vertical section of the system housing, so as to generate a linear visible targeting beam 270 that is projected into the FOV of the digital imaging subsystem 200.

The image formation and detection subsystem 221 includes image formation (camera) optics 234 for providing the field of view (FOV) 233 upon an object to be imaged and a CMOS area-type image detection array 235 for detecting imaged light reflected off the object during illumination and image acquisition/capture operations.

The primary function of the LED-based illumination subsystem 222 is to produce a wide-area illumination field 36 from the LED array 223 when an object is automatically detected within the FOV. Notably, the field of illumination has a narrow optical-bandwidth and is spatially confined within the FOV of the image formation and detection subsystem 221 during modes of illumination and imaging, respectively. This arrangement is designed to ensure that only narrow-band illumination transmitted from the illumination subsystem 222, and reflected from the illuminated object, is ultimately transmitted through a narrow-band transmission-type optical filter subsystem 240 within the system and reaches the CMOS area-type image detection array 235 for detection and processing, whereas all other components of ambient light collected by the light collection optics are substantially rejected at the image detection array 235, thereby providing improved SNR, thus improving the performance of the system.

The narrow-band transmission-type optical filter subsystem 240 is realized by (1) a high-pass (i.e. red-wavelength reflecting) filter element embodied within at the imaging window 203, and (2) a low-pass filter element mounted either before the CMOS area-type image detection array 235 or anywhere after beyond the high-pass filter element, including being realized as a dichroic mirror film supported on at least one of the FOV folding mirrors employed in the module.

The automatic light exposure measurement and illumination control subsystem 224 performs two primary functions: (1) to measure, in real-time, the power density [joules/cm] of photonic energy (i.e. light) collected by the optics of the system at about its image detection array 235, and to generate auto-exposure control signals indicating the amount of exposure required for good image formation and detection; and (2) in combination with the illumination array selection control signal provided by the system control subsystem 230, to automatically drive and control the output power of the LED array 223 in the illumination subsystem 222, so that objects within the FOV of the system are optimally exposed to LED-based illumination and optimal images are formed and detected at the image detection array 235.

The primary function of the image capturing and buffering subsystem 225 is (1) to detect the entire 2-D image focused onto the 2D image detection array 235 by the image formation optics 234 of the system, (2) to generate a frame of digital pixel data for either a selected region of interest of the captured image frame, or for the entire detected image, and then (3) buffer each frame of image data as it is captured.

Notably, in the illustrative embodiment, the digital imaging subsystem 200 has both single-shot and video modes of imaging. In the single shot mode, a single 2D image frame (31) is captured during each image capture and processing cycle, or during a particular stage of a processing cycle. In the video mode of imaging, the system 200 continuously captures frames of digital images of objects in the FOV. These modes are specified in further detail in US Patent Publication No. 2008/0314985 A1, incorporated herein by reference in its entirety.

The primary function of the digital image processing subsystem (i.e. digital image processor) 226 is to process digital images that have been captured and buffered by the image capturing and buffering subsystem 225, during modes of illumination and operation. Such image processing operations include image-based bar code decoding methods as described in U.S. Pat. No. 7,128,266, incorporated herein by reference.

The primary function of the input/output subsystem 25 is to support data communication interfaces supported by other subsystems with the input/output subsystem 25. Examples of such interfaces, and technology for implementing the same, are given in U.S. Pat. No. 6,619,549, incorporated herein by reference.

The primary function of the system control subsystem 37 is to provide some predetermined degree of control, coordination and/or management signaling services to each subsystem component integrated within the digital imaging subsystem 200. Subsystem 200 can be implemented by a programmed microprocessor, or by the three-tier software architecture supported on micro-computing platform, as described in U.S. Pat. No. 7,128,266, incorporated herein by reference.

The primary function of the system configuration parameter (SCP) table 229A in system memory is to store (in non-volatile/persistent memory) a set of system configuration and control parameters (i.e. SCPs) for each of the available features and functionalities, and programmable modes of supported system operation, and which can be automatically read and used by the system control subsystem 230 as required during its complex operations. Notably, such SCPs can be dynamically managed as taught in great detail in co-pending US Publication No. 2008/0314985 A1, incorporated herein by reference.

As shown in FIGS. 4 through 4A4, automatic object edge-motion detection subsystem 43 comprises three spatially separated coplanar object detection modules 44A1, 44A2; 44B1, 44B2 and 44C1, 44C2, each pair being located at an edge of the 3D scanning volume 100. As best shown in FIG. 1A, each pair of modules 44A1, 44A2; 44B1, 44B2, and 44C1, 44C2 generates a pair of closely parallel IR-based detection beams 60A, 60B, which are projected substantially normal to the horizontal scanning window 3B, so as to automatically detect when an object enters and leaves (i.e. exits) the 3D scanning volume during operation of the system. Each module 44 comprises an IR photo-receiver for receiving reflections of the amplitude modulated IR beam, using a synchronous detection circuitry, well known in the art. Each coplanar object detection module comprises: light transmission apertures 45 and 46 formed in a block or module 47, in co-aligned spatial relationship; a IR photo-transmitter (i.e. IR LED) 48 mounted on a printed circuit (PC) board 52, for generating a high-frequency amplitude modulated IR beam, supported in the module and provided with a cylindrical lens 48A to produce a planar IR light beam 50; an IR photo-receiver (i.e. IR photodiode) 51 mounted on PC board 52 within the block 47 for receiving over its FOV 53, return light generated by IR LED 48 and transmitted through aperture 46, in a coplanar manner with the planar IR beam 50, to produce a coplanar IR object illumination and detection plane 60 from the module 44. During operation, the amplitude modulated IR LED 48 is generated while the planar IR photodiode 51 synchronously detects through aperture 46, light energy reflected/scattered off objects in the FOV 53. As shown in FIG. 4, the outputs of each of the six object detection modules 44A1 through 44C2 are provided to processor 61, for processing and generation of control signals indicating at least the following detected conditions: when an object enters 3D scanning volume 100; when an object leaves 3D scanning volume 100; when an object undergoes pass-through motion; and when an object undergoes presentation motion.

In FIGS. 1B1, 1D2 and 2, the digital video projection display subsystem 400 is described in greater technical detail. As shown, the digital video projection module 410 generates digital video images captured (in real-time) by the digital imaging subsystem 200, and these digital image frames projected off FOV folding mirror 415, and projected onto the projection display region 420 on the vertical scanning window 3A in the vertical housing section 2A. Preferably, projection display region 420 is made from hard glass material, and is etched on both front and back surfaces so that light from the projected digital video images is transmitted into, scattered within, and is transmitted from the (glass) projection display region 420 to the viewer, so that a crisp corresponding digital image appears on the front surface of the projection display region 420 as viewed from the cashier/operator side of the system. So configured, the video projection display subsystem 400 allows the cashier or system operator to view on the projection display screen/region 420, a bar code symbol on any product being scanned within the 3D scanning/imaging zone, thereby providing visual feedback to assist the operator in aligning the bar code symbol on the product within the FOV of the system, during checkout operations at the POS station. This feature helps increase cashier productivity and system throughput.

In FIGS. 1C1, 1D2, and 2, the digital video projection display subsystem 500 is described in greater technical detail. As shown, the digital heads-up display (HUD) projection module 550 generates a digital image of a heads-up display (HUD) containing product price and description information, in response to when the operator successfully scans the bar code symbol on each product being checked out. The HUD can also include one or more images of the scanned product, identified using any of the data capture modes supported by the hybrid system.

As shown in FIGS. 1C1 and 2, each HUD image is generated and managed by control subsystem 37, and projected off FOV folding mirror 515, and onto the projection display region 520 on the vertical scanning window 3A in the vertical housing section 2A. The projection display region 520 is also etched on both front and back surfaces so that light from the projected digital image is transmitted into, scattered within and is transmitted from the (glass) projection display region 520 so that a crisp corresponding digital image appears on the front surface of the projection display region 520 as viewed from the cashier/operator side of the system.

The bi-optical system of the illustrative embodiment supports pass-through and presentation motion that an object can experience when being scanned and/or imaged using the hybrid system 1. By monitoring and collecting object motion information, into and out of the 3D scanning volume 100, during system operation, the system controller is capable of controlling the digital imaging subsystem 200 in a more optimal manner, i.e. activating the imaging subsystem when needed most at the POS station. Also, the automatic object edge-motion detection subsystem 43 can be used to record cashier/operator scanning motion behavior for subsequent analysis and performance measurement, in effort to improve cashier throughput and productivity.

Figure 5A:
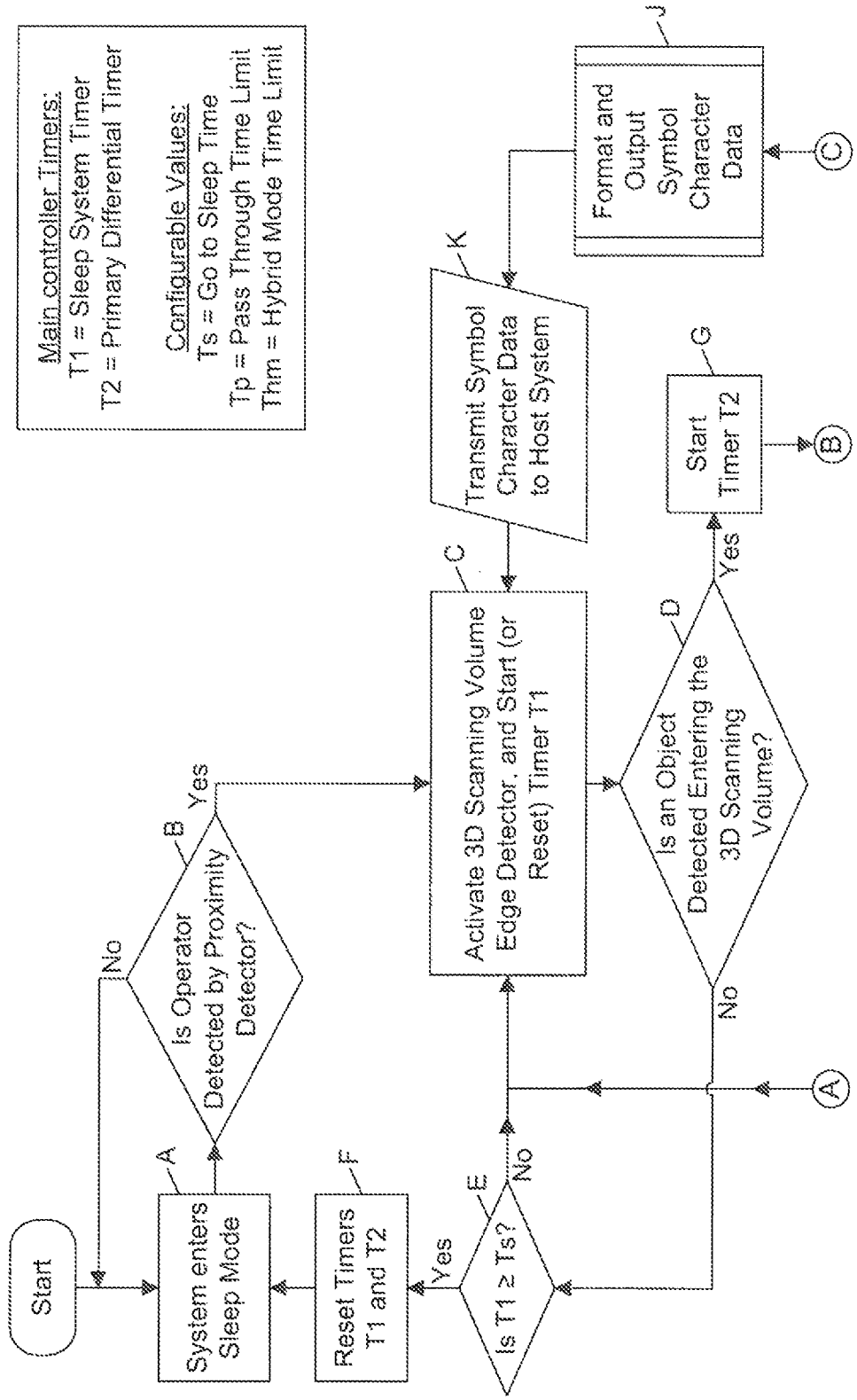
FIGS. 5A and 5B, taken together, set forth a flow chart describing the control process supported by the system controller within the bi-optical code symbol reading system of the first illustrative embodiment, during its various modes of operation.
Figure 5B:
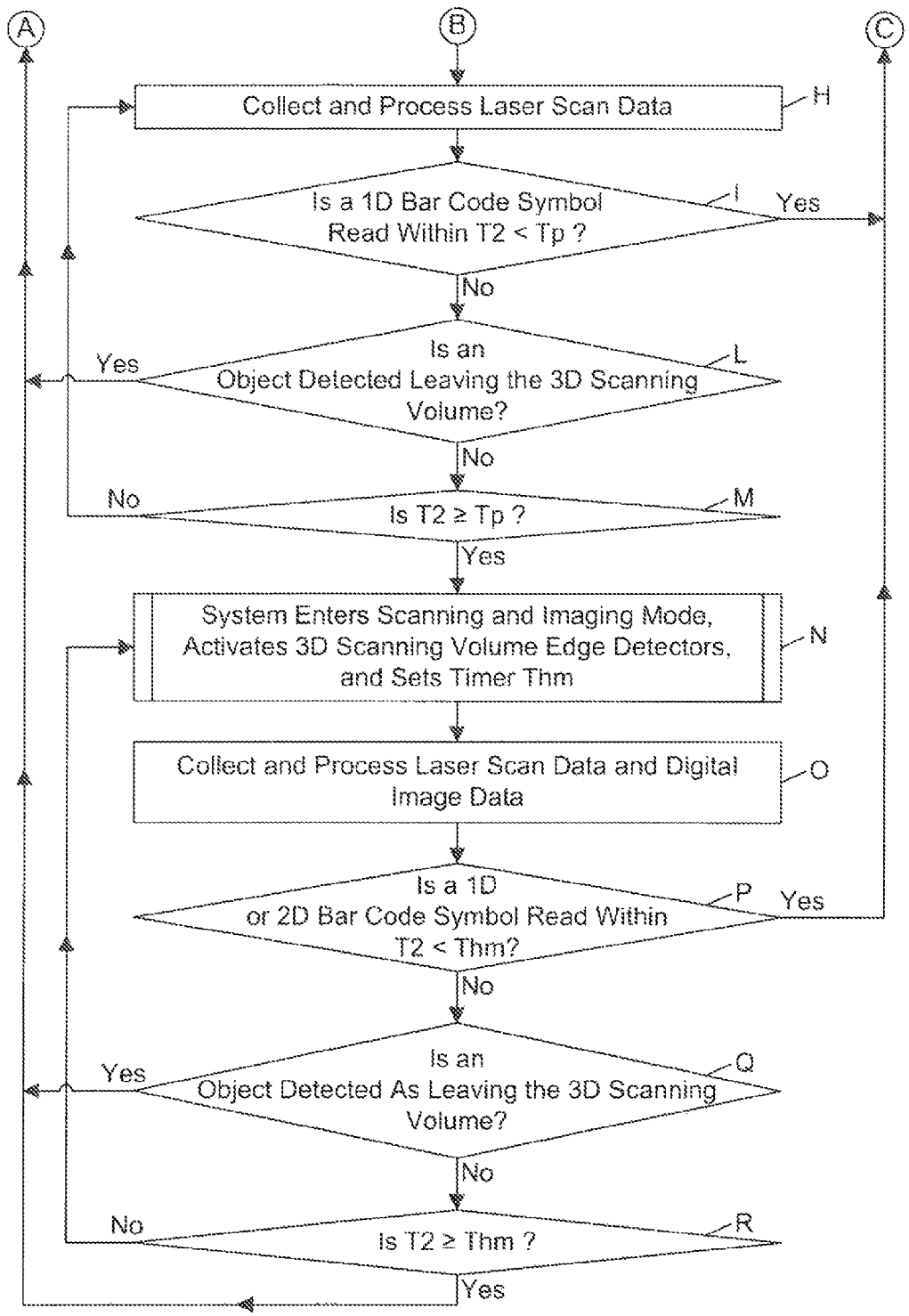

FIGS. 5A and 5B describe the control process supported by the system controller within the bi-optical code symbol reading system of the first illustrative embodiment.

At the START Block in FIG. 5A, the system is initialized and programmable/configurable parameters or variables are reset, and at Block A, the system enters its SLEEP mode.

At Block B, the system controller determines whether or not the operator is detected by proximity detector 44D. If not, then the system controller returns to Block A, and if an operator is detected, then the system proceeds to Block C and activates the 3D scanning volume edge detector (i.e. object edge-motion detection subsystem 43), and starts (or resets) Timer T1.

At Block D, the system controller determines whether or not an object is detected entering the 3D Scanning Volume, and if not, the proceeds to Block E, and determines if Timer T1>Ts. If so, then at Block F, the system controller resets Timers T1 and T2. If not, then the system controller returns to Block C.

If at Block G in FIG. 5A, an object is detected as entering the 3D scanning volume, then the system controller starts Timer T2, and at Block H in FIG. 5B, collects and processes laser scan data in effort to read a 1D bar code symbol.

At Block I in FIG. 5B, the system controller determines whether or not a 1D bar code symbol is read within T2<Tp. In the event that a 1D bar code symbol has been read, then at Block J the symbol character data is formatted and at Block K is transmitted to the host system 9, and then the system returns to Block C, as indicated in FIG. 5A.

If at Block I, a 1D bar code symbol is not decoded within T2<Tp, then the system controller determines whether or not an object is detected as leaving the 3D scanning volume, and if so, then returns to Block C, as indicated in FIGS. 5A and 5B.

If an object is not detected leaving the 3D scanning volume at Block L, then the system controller determines at Block M whether or not T2> or =Tp.

If the condition T2> or =Tp is not met at Block M, then the system controller returns to Block H and continues to collect and process laser scan data in effort to read a 1D bar code symbol. However, if this timer condition is met at Block M, then the system controller advances to Block N and the system enters the scanning and imaging mode, activates the 3D scanning volume edge detectors, and sets Timer Thm.

Then at Block O, the system controller collects and processes laser scan data and digital image data so as to read 1D and/or 2D bar code symbols.

At Block P, the system controller determines whether or not a 1D or 2D bar code symbol is read within T2<Thm, and if so, then the system controller proceeds to Block C. In the event that no 1D or 2D bar code symbol is read within T2<Thm, then the system controller proceeds to Block Q and determines whether or not an object is detected as leaving the 3D scanning volume.

In the event that an object is detected leaving the 3D scanning volume at Block Q, then the system controller returns to Block C indicated in FIGS. 5A and 5B. In the event that an object is not detected leaving the 3D scanning volume at Block Q, then the system controller advances to Block R. At Block R, the system controller determines whether or not T2>Thm, and if not, then returns to Block H, as shown in FIG. 5B. However, in the event that T2>Thm, then the system controller returns to Block C, as indicated in FIGS. 5A and 5B.

Figure 6:
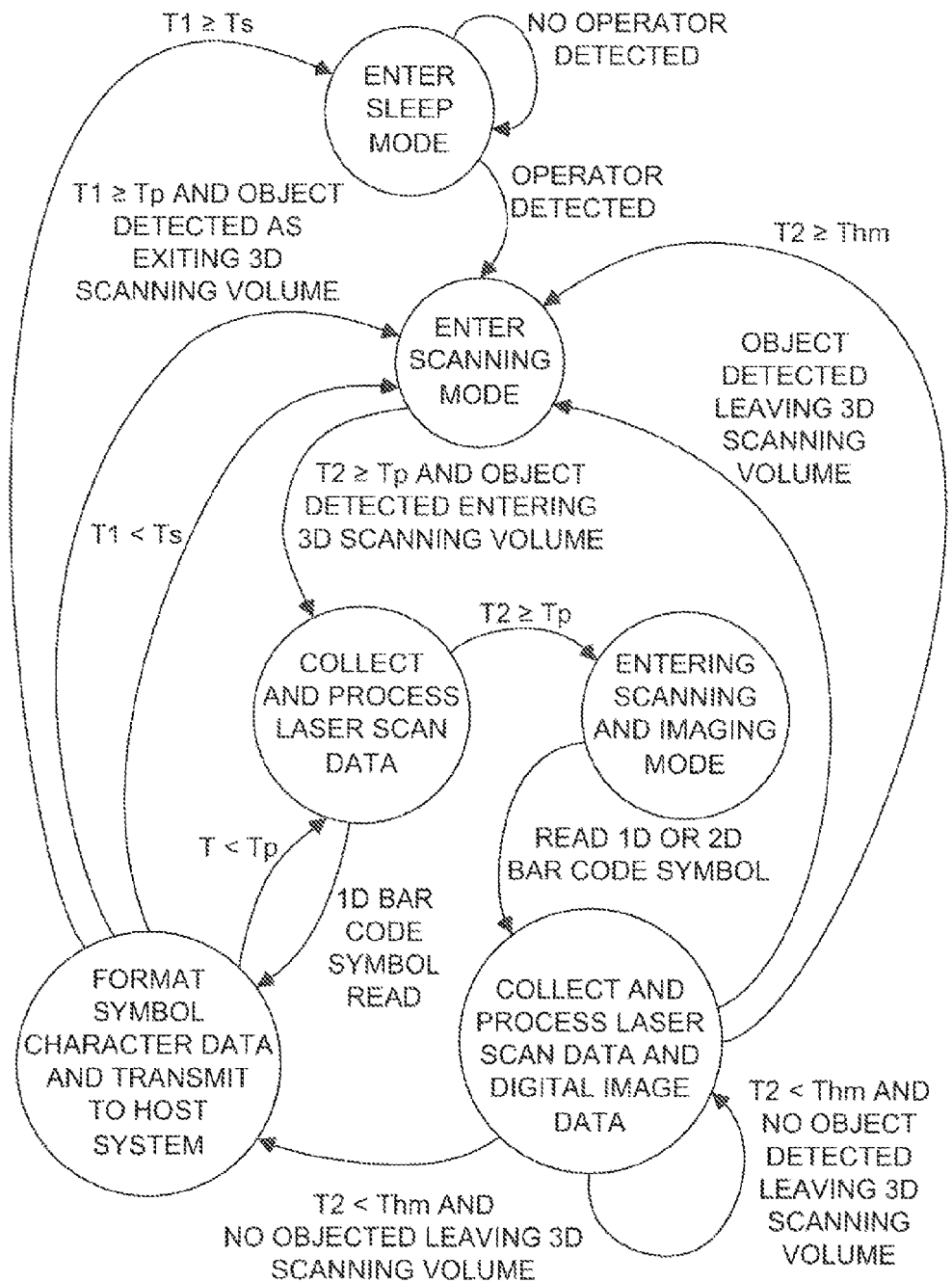
FIG. 6 is a state transition diagram for the bi-optical bar code symbol reading system of the illustrative embodiment, whose operation is specified in the flow chart of FIGS. 5A and 5B.

FIG. 6 shows a state transition diagram for the system control process described in the flow chart of FIGS. 5A and 5B. As shown, the primary states of this system are: Enter Sleep Mode; Enter Scanning Mode; Collect And Process Laser Scan Data; Format Symbol Character Data And Transmit To Host System; Entering Scanning And Imaging Mode; And Collect And Process Laser Scan Data And Digital Image Data.

As shown in FIG. 6, events that can cause a transition in the state of the system include: No Operator Detected; Operator Detected; T2>Tp And Object Detected Entering 3*d* Scanning Volume; 1d Bar Code Symbol Read; T1<Ts; T1>Or=Tp And Object Detected As Exiting 3d Scanning Volume; T1>Or=Ts; T<Tp; T2>Or=Tp; Read 1d Or 2d Bar Code Symbol; T2<Thm And No Objected Leaving 3d Scanning Volume; T2<Thm And No Object Detected Leaving 3d Scanning Volume; Object Detected Leaving 3d Scanning Volume; T2>Or=Thm. Notably, the system control process and associated state transitions are for illustration purposes only, and it is understood that diverse kinds of system configurations and operations may be implemented in any given application at hand, using the various techniques disclosed herein.

Figure 7:
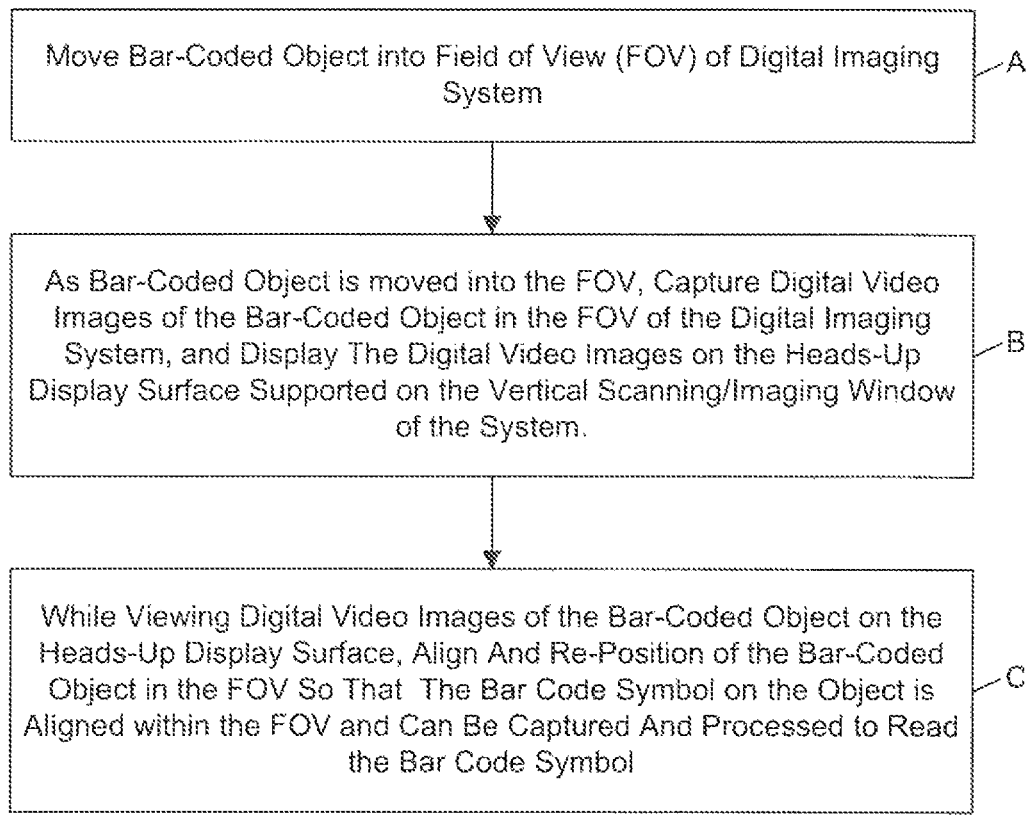
FIG. 7 is a flow chart setting forth the major steps of the method of reading bar code symbols using the bi-optical code symbol reading system of FIGS. 1A through 4.

FIG. 7 describes a method of reading bar code symbols when using the hybrid bi-optical code symbol reading system of the illustrative embodiment described above.

As indicated at Block A, the first step of the method involves the operator (e.g. cashier or customer) moving a bar-coded object into the field of view (FOV) of the hybrid system, where the digital imaging mode is automatically activated as described hereinabove.

As indicated at Block B, as a bar-coded product is moved into the FOV, capture digital video images of the bar-coded object in the FOV and display the digital video images on the projection display surface supported on the vertical scanning/imaging window of the system.

As indicated at Block C, while viewing the digital video images of the bar-coded object on the projection display region 420 on the vertical scanning window 3A, align and re-position the bar-coded product in the FOV so that the bar code symbol on the product is aligned within the FOV and is captured and processed to read the bar code symbol, and identify the product. In response to identifying the product, the digital HUD projection display system 500 automatically generates and projects a product-specific digital HUD image for the product on the projection display region 520 of the vertical scanning window 3A.

Modifications That Come To Mind

The above-described control process has been provided as an illustrative example of how the laser scanning subsystem and digital imaging subsystem can be controlled when the hybrid system is operating in its various modes of system operation. Variations and modifications to this control process will readily occur to those skilled in the art having the benefit of the present disclosure. All such modifications and variations are deemed to be within the scope of the accompanying Claims.

What is claimed is:

1. A bi-optical symbol reading system for installation at a point of sale (POS) station, comprising:
    a system housing having a vertical housing section with a vertical scanning window and a horizontal housing section with a horizontal scanning window adjacent said vertical scanning window;
    a laser scanning subsystem disposed in said system housing, for generating and projecting a plurality of laser scanning planes through said vertical and horizontal scanning windows, which intersect within a 3D scanning volume defined between said vertical and horizontal scanning windows and provide a laser scanning pattern within said 3D scanning volume, for scanning each product within said 3D scanning volume and producing scan data for decode processing;
    a scan data processor for processing said scan data produced by said laser scanning subsystem in effort to read a symbol on each product passed through said 3D scanning volume, and generate symbol character data representative of each said read symbol;
    a digital imaging subsystem, disposed within said vertical section of said system housing, for automatically projecting a field of view (FOV) into said 3D scanning volume, and capturing and processing one or more digital images of each product present in said FOV;
    a digital heads-up display (HUD) image projection subsystem, disposed within said vertical section of said system housing, and supporting the projection of a heads-up display (HUD) for each product, on a portion of said vertical scanning window, wherein each said HUD contains price and other information of each product identified during checkout operations at said POS station; and
    a system controller for automatically controlling the operation of said laser scanning subsystem during said system operation.

2. The bi-optical symbol reading system of claim 1, wherein said laser scanning pattern is an omni-directional laser scanning pattern within said 3D scanning volume.

3. The bi-optical symbol reading system of claim 1, which includes an automatic wake-up detector for detecting the presence of an operator in proximity of said system housing.

4. The bi-optical symbol reading system of claim 1, comprising an automatic object edge-motion detection subsystem.

5. The bi-optical symbol reading system of claim 1, comprising a digital display subsystem for displaying digital images on a portion of said vertical scanning window.

6. The bi-optical symbol reading system of claim 1, comprising:
 a digital imaging subsystem for capturing digital images having a field of view projected through said vertical scanning window; and
 a digital display subsystem for displaying digital images captured by said digital imaging subsystem on a portion of said vertical scanning window.

7. The bi-optical symbol reading system of claim 1, comprising:
 a digital imaging subsystem for capturing digital video having a field of view projected through said vertical scanning window; and
 a digital display subsystem for displaying digital video captured by said digital imaging subsystem on a portion of said vertical scanning window.

8. A bi-optical symbol reading system comprising:
 a system housing having a vertical housing section with a vertical scanning window and a horizontal housing section with a horizontal scanning window adjacent said vertical scanning window;
 a digital imaging subsystem, disposed within said system housing, supporting the capture of digital video of each product presented within a field of view (FOV) of said digital imaging subsystem projected through said vertical scanning window; and
 a digital video display subsystem, disposed within the vertical section of said system housing, and supporting the display of digital video frames on said vertical scanning window during digital-imaging based symbol reading operations, so as to provide visual feedback and improve symbol and FOV alignment during symbol reading operations.

9. The bi-optical symbol reading system of claim 8, wherein said digital video display subsystem comprises a digital video projection display subsystem supporting the display of digital video frames on said vertical scanning window during digital-imaging based symbol reading operations, so as to provide visual feedback and improve symbol and FOV alignment during symbol reading operations.

10. The bi-optical symbol reading system of claim 8, comprising an automatic wake-up detector for detecting the presence of an operator in proximity of said system housing.

11. The bi-optical symbol reading system of claim 8, comprising an automatic object edge-motion detection subsystem.

12. A bi-optical symbol reading system comprising:
 a system housing having a vertical housing section with a vertical window and a horizontal housing section with a horizontal window adjacent said vertical window;
 a symbol reading subsystem for reading symbols having a field of view projected through said vertical window; and
 a digital display subsystem, disposed within the vertical section of said system housing, and supporting the display of digital images on a portion of said vertical window during system operation.

13. The bi-optical symbol reading system of claim 12, wherein said digital display subsystem comprises a digital video display subsystem supporting the display of digital video frames on said vertical window.

14. The bi-optical symbol reading system of claim 13, wherein said digital video display subsystem supports the projection of digital video frames on said vertical window.

15. The bi-optical symbol reading system of claim 13, which further comprises:
 a digital imaging subsystem, disposed within said system housing, supporting the capture of digital images of each product presented within a field of view (FOV) of said digital imaging subsystem projected through said vertical window; and
 wherein said digital video display subsystem comprises a digital video projection display subsystem supporting the display of digital images on said vertical window during digital-imaging based symbol reading operations.

16. The bi-optical symbol reading system of claim 12, which further comprises:
 a laser scanning subsystem disposed in said system housing, for generating and projecting a plurality of laser scanning planes through said vertical and horizontal windows, to provide a laser scanning pattern within a scanning volume, for scanning each product within said scanning volume and producing scan data for decode processing; and
 a scan data processor for processing said scan data produced by said laser scanning subsystem in effort to read a symbol on each product passed through said scanning volume, and generate symbol character data representative of each said read symbol.

17. The bi-optical symbol reading system of claim 12, comprising an automatic wake-up detector for detecting the presence of an operator in proximity of said system housing.

18. The bi-optical symbol reading system of claim 12, comprising an automatic object edge-motion detection subsystem.

19. The bi-optical symbol reading system of claim 12, comprising a digital imaging subsystem for capturing digital images having a field of view projected through said vertical window, wherein said digital display subsystem displays digital images captured by said digital imaging subsystem.

20. The bi-optical symbol reading system of claim 12, comprising a digital imaging subsystem for capturing digital video having a field of view projected through said vertical window, wherein said digital display subsystem displays digital video captured by said digital imaging subsystem.

* * * * *